(12) United States Patent
Huber et al.

(10) Patent No.: US 7,215,041 B2
(45) Date of Patent: May 8, 2007

(54) CHARGING CIRCUIT FOR A FREQUENCY CONVERTER

(75) Inventors: Norbert Huber, Teisendorf (DE); Franz Ritz, Übersee (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 381 days.

(21) Appl. No.: 10/656,924

(22) Filed: Sep. 5, 2003

(65) Prior Publication Data
US 2004/0105199 A1    Jun. 3, 2004

(30) Foreign Application Priority Data
Sep. 5, 2002    (DE)    ................ 102 41 036

(51) Int. Cl.
H02J 1/06    (2006.01)
H02J 15/00    (2006.01)
(52) U.S. Cl. ............... 307/109; 320/166; 320/138
(58) Field of Classification Search ......... 320/138, 320/166, 167; 307/109, 110, 152
See application file for complete search history.

(56) References Cited

U.S. PATENT DOCUMENTS

| 4,507,724 | A | * | 3/1985 | Glennon ..................... 363/98 |
| 5,408,842 | A |   | 4/1995 | Goto et al. |
| 5,568,035 | A | * | 10/1996 | Kato et al. .................. 320/166 |
| 5,953,490 | A | * | 9/1999 | Wiklund et al. ............ 388/811 |
| 6,166,924 | A | * | 12/2000 | Assow ........................ 363/20 |
| 6,275,393 | B1 | * | 8/2001 | Baudelot et al. ............ 320/166 |
| 6,388,906 | B1 |   | 5/2002 | Ferstenberg |
| 6,603,672 | B1 |   | 8/2003 | Deng et al. |
| 6,856,137 | B2 | * | 2/2005 | Roden et al. ................ 324/509 |
| 7,035,123 | B2 | * | 4/2006 | Schreiber et al. ............ 363/37 |
| 2002/0051371 | A1 |   | 5/2002 | Sekiguchi et al. |
| 2003/0067303 | A1 |   | 4/2003 | Hubert et al. |
| 2005/0168897 | A1 | * | 8/2005 | Komulainen ................ 361/85 |

FOREIGN PATENT DOCUMENTS

| DE | 92 16 662.8 U1 | 3/1993 |
| DE | 195 08 348 A1 | 9/1996 |
| DE | 197 41 300 A1 | 3/1999 |
| DE | 101 55 182 A1 | 5/2002 |
| DE | 101 48 740 A1 | 4/2003 |
| EP | 0 621 148 A2 | 10/1994 |
| EP | 0 730 339 A2 | 9/1996 |

* cited by examiner

*Primary Examiner*—Brian Sircus
*Assistant Examiner*—Andrew M. Deschere
(74) *Attorney, Agent, or Firm*—Brinks Hofer Gilson & Lione

(57) ABSTRACT

A charging circuit for a frequency converter having a first feed line with a first constant current source therein and a second feed line with a second constant current source therein. An intermediate circuit capacitor connected between the first feed line and the second feed line, wherein the first constant current source that limits a charging current of the intermediate circuit capacitor. An electronic control device that controls both the first constant current source and the second constant current source in parallel.

6 Claims, 2 Drawing Sheets

CHARGING CIRCUIT FOR A FREQUENCY CONVERTER

Applicants claim, under 35 U.S.C. §119, the benefit of priority of the filing date of Sep. 5, 2002 of a German patent application, copy attached, Ser. No. 102 41 036.4, filed on the aforementioned date, the entire contents of which is incorporated herein by reference.

BACKGROUND OF THE INVENTION

1. Field of the Invention

The present invention relates to a charging circuit for a frequency converter, wherein a first constant current source in the first feed line to an intermediate circuit capacitor limits the charging circuit of the intermediate circuit capacitor.

2. Discussion of Related Art

Such charging circuits are required for dependably charging the large capacitance existing in the intermediate circuit of a capacitor prior to the actual current supply for the capacitor being turned on.

The development of modern frequency converters permits the effective employment of electrical drive mechanisms in increasingly expanding areas of technology. By first rectifying the available supply net voltage, and thereafter processing it by an inverter for controlling a motor, it is possible to realize very accurate control systems for the position or the speed of a drive mechanism. This finds important applications in machine tools, for example. Following the rectification of the supply net voltage, it is customary to perform the smoothing of the voltage and storage of energy by means of an intermediate circuit capacitor of high capacitance in the so-called intermediate circuit. When putting the frequency converter into operation, it is necessary to first charge such an intermediate circuit capacitor, and a special charging circuit is often used for this. In order to not let the charging current of the intermediate circuit capacitor become too high, a limiting device that limits the charging current is necessary. For example, simple resistors, or also constant current sources, can be used.

DE 101 48 740 describes how a high charging current can arise in spite of such a current limitation by a resistor or a constant current source. If, for example, a line-to-ground fault exists at the output of the frequency converter, for example in the connected motor, a very high charging current can flow over one of the recovery diodes of the inverter and cause damage to the frequency converter. Although this high current can only flow as long as the intermediate circuit capacitor is not charged, the high capacitance of the intermediate circuit capacitor permits currents having damaging effects. A circuitry is therefore described in DE 101 48 740, which can detect a line-to-ground fault to begin with and prevents the start-up of the frequency converter in such a case.

However, since it is easily possible by a higher control device to pinpoint such a line-to-ground fault more accurately, for diagnostic purposes the start-up of the frequency converter is desirable in spite of a detected line-to-ground fault. A charging circuit is necessary for this, which permits the charging of the intermediate circuit capacitor with a limited current in spite of a line-to-ground fault at the output of the frequency converter. Once the intermediate circuit capacitor has been charged, the above mentioned error mechanism is no longer of importance, it is now possible on the part of the control device to perform a diagnostic program for pinpointing the line-to-ground fault.

OBJECT AND SUMMARY OF THE INVENTION

It is therefore an object of the present invention to disclose a charging circuit for a frequency converter, which will permit it to be placed into operation even if there is a line-to-ground fault at the output of the frequency converter.

This object is attained by a charging circuit for a frequency converter having a first feed line with a first constant current source therein and a second feed line with a second constant current source therein. An intermediate circuit capacitor connected between the first feed line and the second feed line, wherein the first constant current source that limits a charging current of the intermediate circuit capacitor. An electronic control device controls both the first constant current source and the second constant current source in parallel.

It is now proposed to provide a second constant current source in the second feed line for the intermediate circuit capacitor in addition to the constant current source customarily existing in one of the feed lines for the intermediate circuit capacitor. However, in order not to let the outlay for this measure get too large, a second electronic control device for this second constant current source is omitted in this case. It is found to be sufficient to control the two constant current sources in parallel by a single electronic control device. In the course of this it is also possible to do without a second current sensor, one current sensor in one of the two feed lines to the intermediate circuit capacitor is sufficient.

It is possible by such a circuit to charge the intermediate circuit capacitor in a controlled manner, even if a line-to-ground fault exists at the output of the frequency converter.

Further advantages, as well as details of the present invention, ensue from the subsequent description of a preferred embodiment by the drawings.

DETAILED DESCRIPTION OF THE PREFERRED EMBODIMENTS

Figure 1:
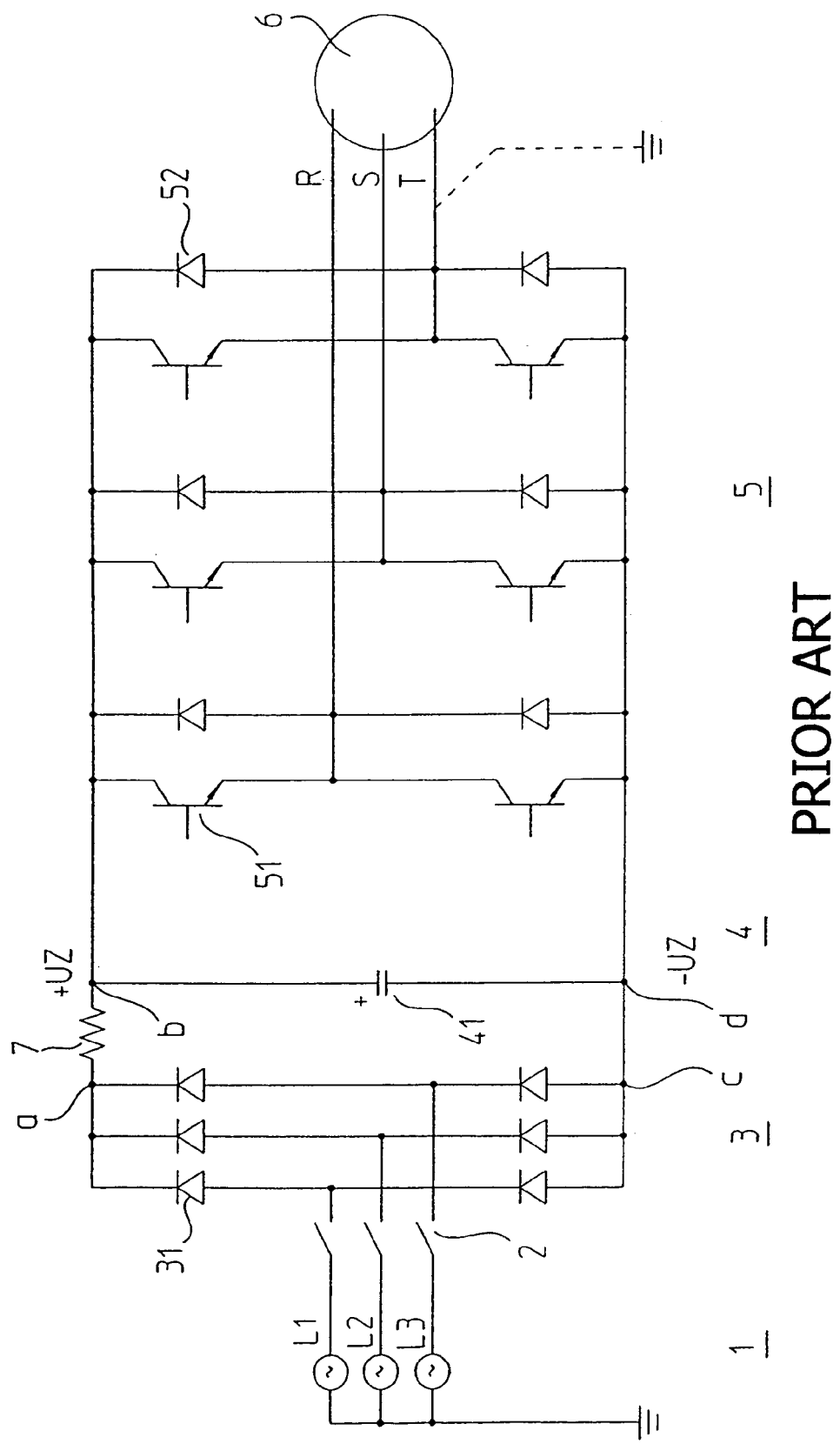
FIG. 1 is a schematic representation of an embodiment of a known drive mechanism.

A conventional drive is represented schematically in FIG. 1. An a.c. voltage in three phases L1, L2, L3 is made available on the power supply side 1. This a.c. voltage is conducted over a charge relay 2 to a rectifier 3 with rectifier diodes 31 in a conventional bridge circuit arrangement. The wavy d.c. voltage generated in this way is supplied via a resistor 7 to the intermediate circuit 4, having an intermediate circuit capacitor 41. The resistor 7 limits the charging current flowing to the intermediate circuit capacitor 41 when the frequency converter is put into operation. The d.c. voltage, smoothed and stabilized by the intermediate circuit capacitor 41, is now converted by an inverter 5 into suitable a.c. voltage with the phases R, S, T for operating a motor 6. A pulse-width modulation, for example, is employed in the course of this. The power transistors 51 of the frequency converter 5 are switched on or off as required by a control device, not represented. In this case recovery diodes 52 must absorb the electrical currents which flow through a power transistor 51 at the moment it is shut-off. Otherwise the inductivities involved, primarily in the connected motor 6, would induce voltages which would lead to the destruction of the motor 6 or of the inverter 5.

However, the recovery diodes 52 could also lead to the problem, already mentioned above, in the course of the start-up of the frequency converter if, for example, a line-to-ground fault exists in the motor. Such a line-to-ground fault in phase T of the motor is indicated by dashed lines in FIG. 1. Since the intermediate circuit capacitor 41 has not yet been charged, the d.c. voltage of the rectifier 3 drops off entirely via the resistor 7. Therefore the contact b of the intermediate circuit capacitor 41 is connected with the negative potential –UZ. Only after the intermediate circuit capacitor 41 has been charged does the d.c. voltage drop off completely via the intermediate circuit capacitor 41, in that case the contact b is connected with the positive potential +UZ, the contact d with the negative potential –UZ.

However, if the indicated line-to-ground fault is present, the anode of the upper right recovery diode 52 in FIG. 1 is connected with the ground potential and, because of its direct connection to the contact b when the intermediate circuit capacitor 41 is not charged, its cathode is connected with the negative potential –UZ. With a voltage difference of typically 280 V, this recovery diode 52 is conductive. Now the intermediate circuit capacitor 41 is charged via this recovery diode 52 without further limitation of the current, the electrical currents flowing in the course of this can destroy the frequency converter.

Figure 2:
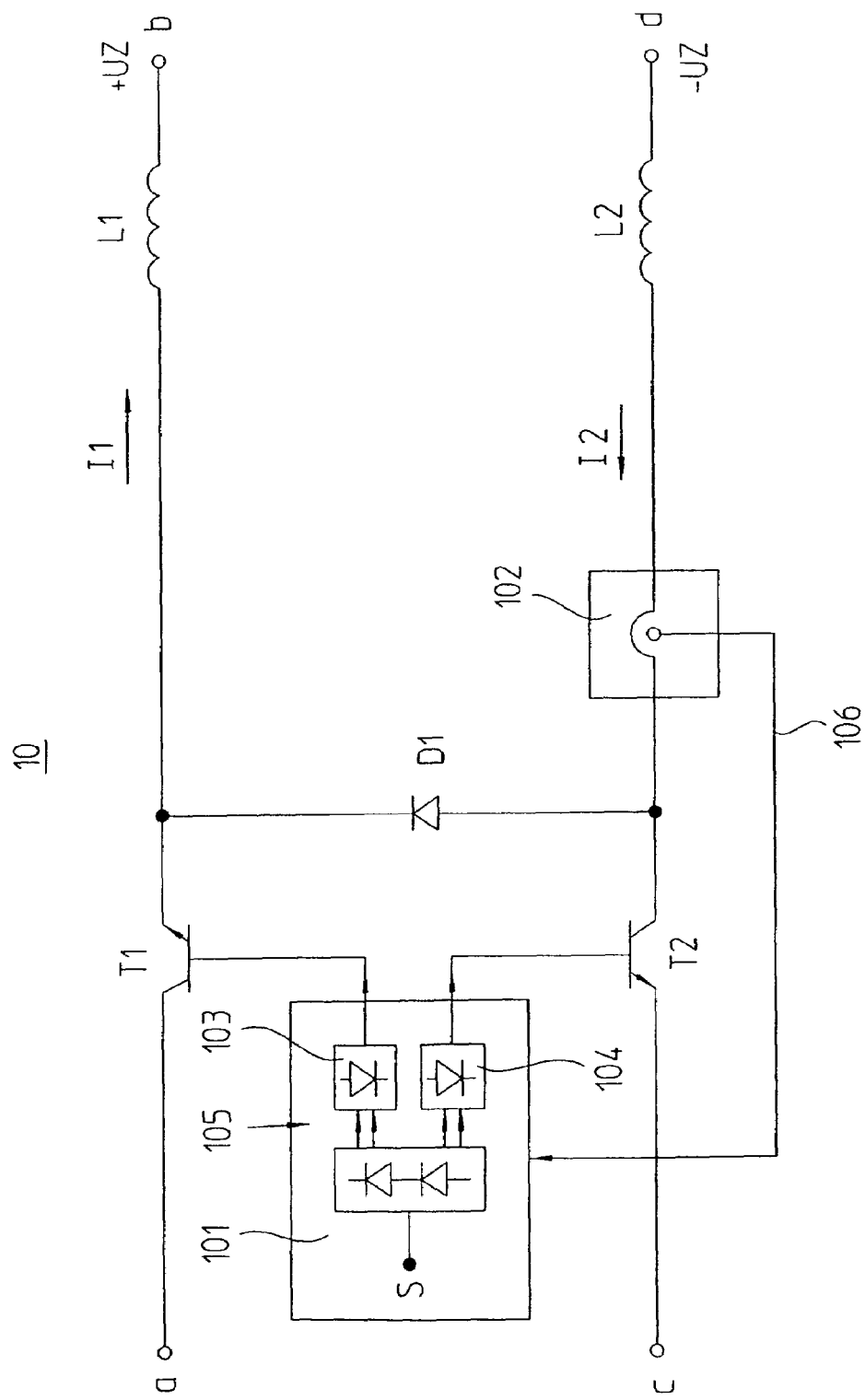
FIG. 2 shows an embodiment of a charging circuit for a frequency converter to be used to modify the drive mechanism of FIG. 1 in accordance wit the present invention.

To prevent this, and to make possible a controlled charging of the intermediate circuit capacitor 41 in spite of the line-to-ground fault, the circuit in FIG. 1 is cut at the contacts a, b, c, d, and a circuit in accordance with FIG. 2 is inserted. The simple electrical current limitation by a resistor 7 or a constant current source in the feed line +UZ to the intermediate circuit capacitor 41 in accordance with FIG. 1 known from the above cited prior art is replaced in this way by the charging circuit 10 in FIG. 2.

Constant current sources T1, T2 have now been placed into the two feed lines +UZ, –UZ for the intermediate circuit capacitor 41. Usually such a constant current source includes a power transistor, which is shut off as soon as a current sensor signals an electrical current above a threshold value, and is switched on again as soon as the electrical current falls below a lower threshold value. Therefore a current sensor and an electronic control device are always required for controlling such a constant current source. However, in order to keep the outlay small in the present case of application, the constant current sources T1, T2 are connected with one electronic control device 101. A current sensor 102 is located in only one of the two feed lines +UZ, –UZ to the intermediate circuit capacitor 41, whose output signal 106 is processed into a control signal S in the electronic control device 101. If the measured current I2 is too high, both constant current sources T1, T2 are switched of by this common control signal S, if the current drops below a lower threshold value, the constant current sources T1, T2 are switched on. Thus, the constant current sources T1, T2 are controlled in parallel in that a common control signal S decides the respective status of the constant current sources T1, T2. Since the emitters of the power transistors of the constant current sources T1, T2 are connected to very different potentials (typically a difference of 560 V), very different gate voltages are required for their control. The common control signal S is not suited for directly controlling both constant current sources T1, T2, it is therefore electrically separated from the respective driver stages 103, 104 of the constant current sources T1, T2 by an optical coupler 105. The required different gate voltages of the constant current sources T1, T2 can be easily generated in this way.

Furthermore, chokes L1, L2 are located in the two feed lines +UZ, –UZ for the intermediate circuit capacitor 41. In the end, these chokes L1, L2 assure that the intermediate circuit capacitor 41 is charged as symmetrically as possible, even in case of a line-to-ground fault. By their inductivity, the chokes L1, L2 prevent an abrupt rise of the electrical current I1, I2, which would occur in a frequency converter in accordance with the prior art in case of a line-to-ground fault. Instead, the electrical current I1, I2 rises slowly and approximately evenly in both feed lines +UZ, –UZ for the intermediate circuit capacitor 41. This rise is stopped by the electronic control device 101 when the upper threshold value has been reached. The electrical current initially continues to flow through a recovery diode D1 and in the process drops slowly until the constant current sources T1, T2 are activated again and the cycle starts anew. The intermediate circuit capacitor 41 is charged in a controlled manner and approximately symmetrically with respect to the ground potential. In the course of this, the voltage drop via the intermediate circuit capacitor 41 rises symmetrically, starting at 0 V, following the switching on of the charging relays 2, until the contact b is connected to the positive operating voltage +UZ and the contact d to the negative operating voltage –UZ.

Following the controlled charging of the intermediate circuit capacitor 41, the charging circuit 10 has completed its task. It is now possible, for example, to switch it over via a main contactor to a more powerful current supply, which can provide electrical currents in the range of 100 A, while electrical currents in the range of only 10 A are used for the charging process by the charging relay 2.

With the intermediate circuit capacitor 41 charged, it is now possible for a higher control device to execute a diagnostic program, by which a possible line-to-ground fault can be pinpointed more accurately.

By the described charging circuit 10 it is possible to prevent an impermissibly strong charging current of the intermediate circuit capacitor 41, without having to provide the customarily required outlay for a constant current source T1, T2 in both feed lines +UZ, –UZ of the intermediate circuit capacitor 41. Instead, the electronic control device 101 for the constant current sources T1, T2 is required only once. It is also sufficient to monitor the charging current by only one current sensor 102 in one of the two feed lines +UZ, –UZ of the intermediate circuit capacitor 41. The described charging circuit 10 permits in particular the controlled charging of the intermediate circuit capacitor 41, even if there is a line-to-ground fault at the output of the inverter 5.

Further exemplary embodiments exist within the scope of the present invention besides the described examples.

We claim:

1. A charging circuit for a frequency converter, comprising:
    a first feed line comprising a first constant current source therein;
    a second feed line comprising a second constant current source therein;
    an intermediate circuit capacitor connected between said first feed line and said second feed line, wherein said first constant current source limits a charging current of said intermediate circuit capacitor;

an electronic control device that controls both said first constant current source and said second constant current source in parallel; and a current sensor that is located in only one of said first and second feed lines, wherein said current sensor generates an output signal that is provided to said electronic control device, wherein if said output signal is too high, then both said first constant current source and said second current source are switched off by said electronic control device and wherein if said output signal is too low, then both said first constant current source and said second current source are switched on by said electronic control device.

2. The charging circuit in accordance with claim 1, wherein a common control signal for both said first constant current source and said second constant current source is generated from said output signal of said current sensor.

3. The charging circuit in accordance with claim 1, wherein a first choke is provided in said first feed line and a second choke is provided in said second feed line.

4. The charging circuit in accordance with claim 3, further comprising a recovery diode switched in between said first feed line and said second feed line, said recover diode absorbs charge current flowing in said first and second feed lines after said first constant current source and said second constant current source have been switched off.

5. The charging circuit in accordance with claim 1, wherein said electronic control device comprises:

a first driver stage for said first constant current source;

a second driver stage for said second constant current source, wherein said first and second driver stages are electrically separated from said control signal used for parallel control of said first and second constant current sources.

6. The charging circuit in accordance with claim 5, further comprising optical couplers that electrically separate said control signal and said first and second driver stages.

* * * * *